United States Patent
Kojima et al.

(10) Patent No.: US 6,876,823 B2
(45) Date of Patent: Apr. 5, 2005

(54) IMAGE-FORMING DEVICE

(75) Inventors: Toshiya Kojima, Kanagawa (JP); Masao Nakahara, Mie-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/899,530

(22) Filed: Jul. 6, 2001

(65) Prior Publication Data

US 2002/0015065 A1 Feb. 7, 2002

(30) Foreign Application Priority Data

Jul. 6, 2000 (JP) ........................ 2000-205739

(51) Int. Cl.⁷ .................... G03G 15/20; G03G 15/00
(52) U.S. Cl. ................... 399/69; 399/70; 399/82; 219/216; 347/140; 347/17
(58) Field of Search ................ 399/69, 70, 67, 399/82; 219/216, 494, 201; 347/140, 17; 355/27; G03G 15/20, 15/00; H05B 1/00; B41J 2/385

(56) References Cited

U.S. PATENT DOCUMENTS

| | | | | |
|---|---|---|---|---|
| 4,006,985 A | * | 2/1977 | Hutner | 399/69 |
| 4,367,037 A | * | 1/1983 | Nishikawa | 399/69 |
| 4,754,294 A | * | 6/1988 | Kato | 346/105 |
| 4,998,121 A | * | 3/1991 | Koh et al. | 219/216 |
| 5,093,689 A | * | 3/1992 | Imaeda | 347/140 |
| 5,109,255 A | * | 4/1992 | Nishikawa et al. | 399/70 |
| 5,128,709 A | * | 7/1992 | Nagumo et al. | 355/100 |
| 5,220,389 A | * | 6/1993 | Kishimoto et al. | 399/70 |
| 5,241,349 A | * | 8/1993 | Nagasaka | 399/70 |
| 5,287,155 A | * | 2/1994 | Arai et al. | 399/69 |
| 5,315,350 A | * | 5/1994 | Hirobe et al. | 399/69 |
| 5,321,478 A | * | 6/1994 | Nakamura et al. | 399/70 |
| 5,321,479 A | * | 6/1994 | Yoshida et al. | 399/70 |
| 5,426,494 A | * | 6/1995 | Muto et al. | 219/216 |
| 5,489,935 A | * | 2/1996 | Dornier | 219/216 |
| 5,682,576 A | * | 10/1997 | Sakai et al. | 219/216 |
| 5,761,575 A | * | 6/1998 | Kimoto | 399/70 |
| 5,778,292 A | * | 7/1998 | Arends et al. | 399/307 |
| 5,790,919 A | * | 8/1998 | Lee | 399/43 |
| 5,872,620 A | * | 2/1999 | Wakamiya | 355/69 |
| 5,903,799 A | * | 5/1999 | Saito et al. | 399/69 |
| 5,994,671 A | * | 11/1999 | Suzuki et al. | 219/216 |
| 6,008,829 A | * | 12/1999 | Wakamiya et al. | 347/156 |
| 6,018,140 A | * | 1/2000 | Hirose et al. | 219/216 |
| 6,097,905 A | * | 8/2000 | Watanabe et al. | 219/216 |
| 6,243,559 B1 | * | 6/2001 | Kurotaka et al. | 219/216 |

* cited by examiner

Primary Examiner—Lamson Nguyen
Assistant Examiner—Leonard Liang
(74) Attorney, Agent, or Firm—Sughrue Mion, PLLC

(57) ABSTRACT

An image-forming device in which an image is formed on a transfer material by superposing the transfer material with a photosensitive material on a heating drum. By altering a duty ratio of a control signal from a controller to a heater driver, a heater is controlled such that surface temperature of the heating drum is fixed. At times other than during image-formation, during which precise control is required, the period of the control signal (i.e., of on/off control of the heater) is lengthened. Thus, "flicker" can be suppressed.

14 Claims, 4 Drawing Sheets

T1

T2

T3

IMAGE-FORMING DEVICE

BACKGROUND OF THE INVENTION

1. Field of the Invention

The present invention relates to an image-forming device, and more particularly to an image-forming device which suppresses flicker.

2. Description of the Related Art

Conventionally, to form a predetermined image, an image-forming device is utilized in which the image is exposed onto a photosensitive material and then transferred from the photosensitive material to a transfer material.

In this sort of image-forming device, the image is transferred to the transfer material by winding the transfer material onto a heated heating drum and superposing the photosensitive material with the transfer material.

At this time, for satisfactory transfer of the image onto the transfer material, temperature control is very important. Therefore, the heating drum surface is maintained at a predetermined temperature by feedback control of a heat source provided inside the heating drum; for example, a halogen lamp. Specifically, temperature control of the heating drum is performed by performing fixed period on/off control of the halogen lamp, and altering a duty ratio of the on/off control on the basis of the surface temperature of the heating drum.

In recent years, concerns have been registered about the effects of electric goods on the human body, and anti-flicker countermeasures have been called for in Europe. "Flicker" is defined as "an unsettling influence on vision brought about by photic stimulation due to time variations in intensity or spectral distribution." In an image-forming device, flicker (as in fluorescent roomlights and the like) is brought about, for example, by voltage variations due to on/off control of a heater of a heating drum. Accordingly, measures to suppress flicker in image-forming devices are called for.

SUMMARY OF THE INVENTION

In view of the above-described situation, an object of the present invention is to provide an image-forming device that suppresses flicker.

In the present invention, an image-forming device forms an image on a recording material at a heating drum heated to a predetermined temperature, and the device has: a heating device which heats the heating drum; and a control device which controls the heating device by on/off control, and alters a period of on/off control in accordance with control modes, the control modes including a printing mode for maintaining the heating drum at the predetermined temperature during image-formation, and at least one ordinary mode which is used at times other than during image-formation, wherein, if a period of on/off control of the printing mode is T1 and a period of on/off control of the at least one ordinary mode is T0, then T1<T0.

Humans are most sensitive to flicker at about 10 Hz. Accordingly, for temperature control of the heating drum, on/off control of the heating device is at about 1 Hz, which is lower than 10 Hz. Consequently, by lengthening the period (reducing the frequency) of the on/off control, flicker can be suppressed. However, during image-formation (printing mode), because the transfer material and photosensitive material are wound onto the heating drum, the heating drum temperature tends to fall. Thus, if the on/off control of the heating device is not precise, the heating drum cannot be maintained at the predetermined temperature. That is, altering the period of on/off control T1 is problematic.

In the ordinary mode (or modes) other than the printing mode (for image-formation), because the recording material is not wound onto the heating drum, the only cause of falling temperature is natural cooling. Thus, the heating drum can be maintained at the predetermined temperature (or within a predetermined temperature range) even if the period of on/off control of the heating device is longer than in the printing mode. Consequently, by making the period of the at least one ordinary mode T0 greater than the period of the printing mode T1 (making the frequency lower), the period of on/off control of the heating device can be moved away from 10 Hz, and flicker can be suppressed.

The ordinary mode includes a standby mode which maintains temperature of the heating drum at the predetermined temperature such that image-formation can be initiated promptly, and a pre-heating mode which reduces power consumption of the heating drum while keeping the heating drum in a state such that image-formation can be initiated in a short time. If the period of on/off control of the printing mode is T1, a period of on/off control of the standby mode is T2 and a period of on/off control of the pre-heating mode is T3, then at least one of the following relationships: T1<T2 and T1<T3 is satisfied.

In this image-forming device, the ordinary mode includes the pre-heating mode, which keeps the heating drum in a state such that image-formation can be initiated in a short time, and the standby mode, which maintains the temperature of the heating drum at the predetermined temperature such that image-formation can be initiated promptly. Now, in the standby mode and the pre-heating mode, the recording material is not wound onto the heating drum. Therefore, the only cause of temperature decrease is natural cooling, and the heating drum can be maintained at the predetermined temperature (within a predetermined temperature range) even if the period of on/off control is lengthened. Accordingly, by making one or both of the standby mode period T2 and the pre-heating mode period T3 longer than the printing mode period T1 (i.e., making the corresponding frequencies lower), the period of on/off control of the heating device can be moved away from 10 Hz, and flicker can be suppressed.

In the present invention, the periods T1, T2 and T3 are set so as to satisfy the relationship T1<T2<T3.

In the pre-heating mode, in order to suppress power consumption, a set temperature of the heating drum is lower than a set temperature in the standby mode. Consequently, the period of on/off control in the pre-heating mode T3 can be made longer than the period of the standby mode T2. By making the period of the pre-heating mode T3 longer than the period of the standby mode T2, flicker of the image-forming device can be further suppressed.

DESCRIPTION OF THE PREFERRED EMBODIMENTS

An image-forming device relating to an embodiment of the present invention is now explained.

Schematic Explanation of the Image-forming Device

First, an image-forming device 10 is explained in outline.

Figure 1:
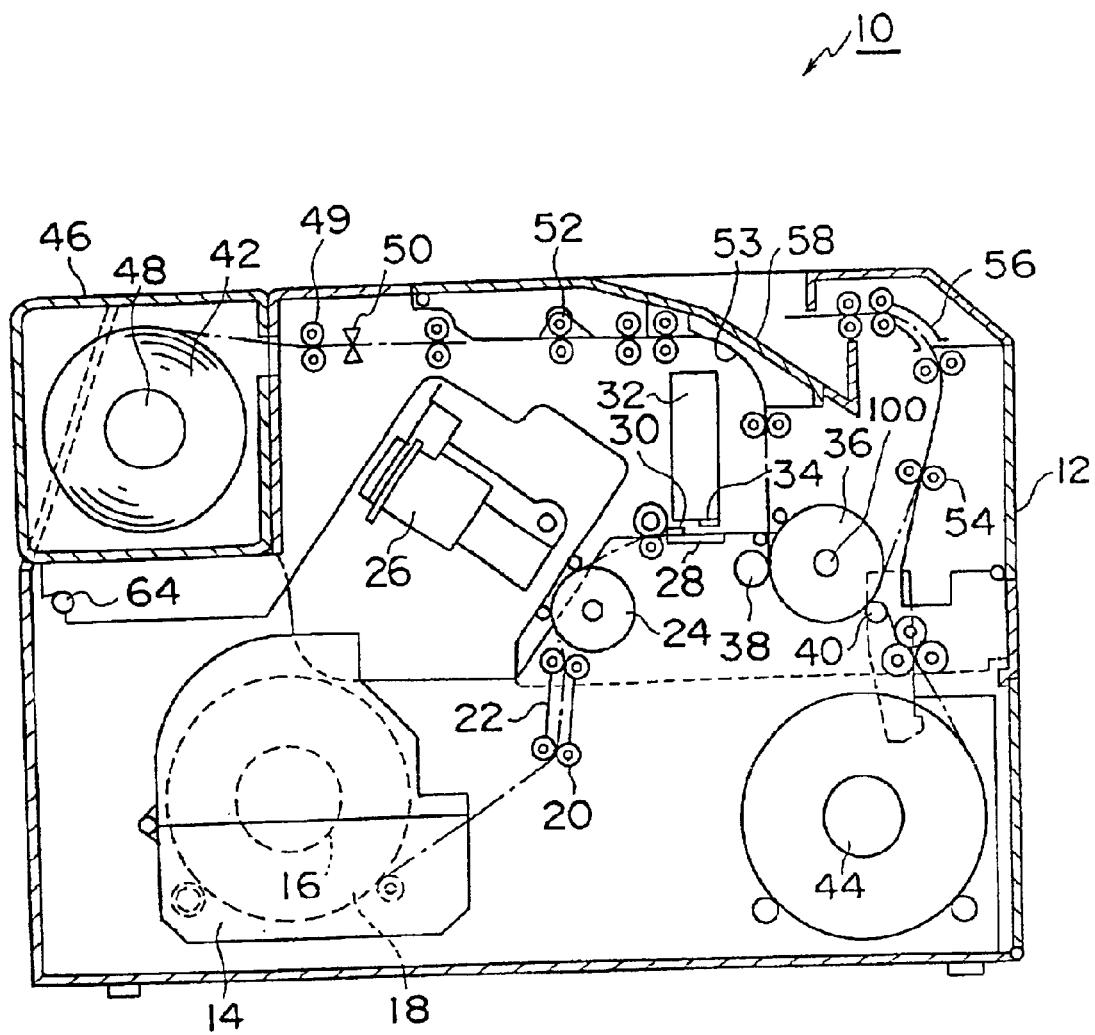
FIG. 1 is a schematic structural view of an image-forming device relating to an embodiment of the present invention.

As shown in FIG. 1, photosensitive material 18 is set up wound around a supply reel 16 in a photosensitive material magazine 14 which is disposed at a lower portion of a housing 12 of the image-forming device 10. The supply reel 16 is rotated by an unillustrated actuator such that the photosensitive material 18 is unwound.

A distal end portion of the photosensitive material 18 is nipped by nip rollers 20 which are provided at a take-out opening of the photosensitive material magazine 14. Under predetermined conditions, the nip rollers 20 draw out the photosensitive material 18 and transport the same to guide plates 22.

The photosensitive material 18 that has passed through the guide plates 22 is wound around an exposure drum 24, and an image is exposed by a scanning head 26. Because the photosensitive material 18 is wound around the exposure drum 24 and exposed in this manner, wrinkling and the like along the width of the photosensitive material 18 does not occur, and flatness of the exposed surface can be conserved.

The photosensitive material 18 onto which the image has been exposed is sandwiched by a support table 28 and a pressure plate 30, and coated with water by a water-absorbent coating member 34 (a sponge or the like) provided at a bottle for water coating 32.

The photosensitive material 18 that has been coated with water is wound onto a heating drum 36 with a fixed pressure from tension rollers 38 and 40. The heating drum 36 is set to a predetermined temperature by a control section 102 (described below) which controls a heater 100 (a halogen lamp). The photosensitive material 18 that has been wound onto the heating drum 36 is heated and superposed on a surface of a transfer material 42. Thus, the image is transferred.

The photosensitive material 18 from which the image has been transferred is wound around a scrap reel 44. Thus, the photosensitive material 18 is transported from the supply reel 16 to the scrap reel 44 without being cut. Therefore, the photosensitive material 18 functions as a timing belt, providing a fixed pressure between the photosensitive material 18 and the transfer material 42.

The transfer material 42 is set up wound around a supply reel 48 in a transfer material magazine 46 which is disposed at an upper portion of the housing 12. The transfer material 42 is drawn out by nip rollers 49, cut to a predetermined length by a cutter 50, guided by transport rollers 52 and a guide plate 53, and wound onto the heating drum 36 while being superposed with the photosensitive material 18.

The transfer material 42, onto which the image has been transferred from the photosensitive material 18 at the heating drum 36, is peeled from the heating drum 36 by an unillustrated separating pawl, guided by transport rollers 54 and a guide plate 56, and delivered to a receiving tray 58.

Explanation of Principal Components

Figure 2:
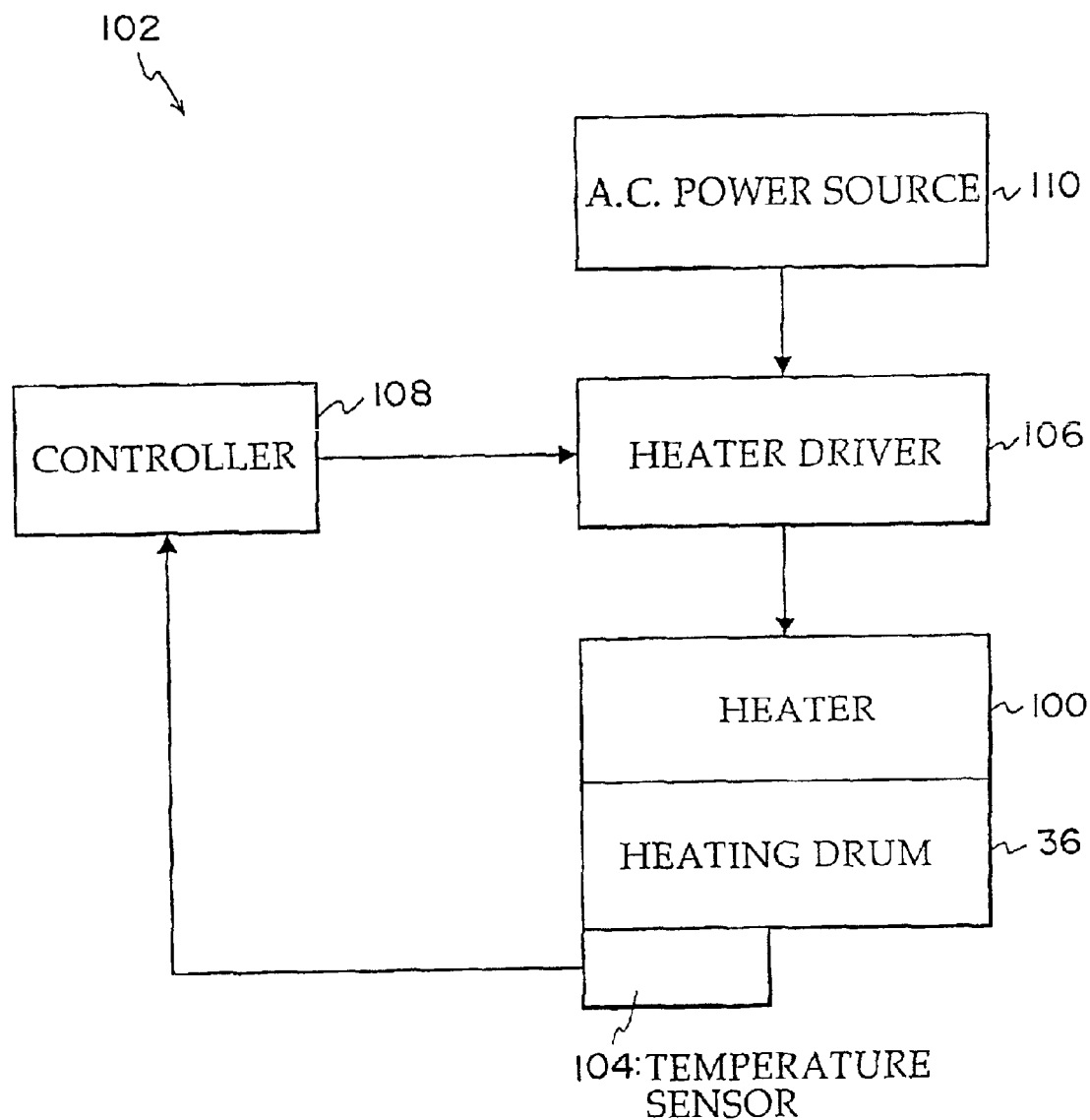
FIG. 2 is a block diagram showing a heating drum control section relating to the embodiment of the present invention.

Next, the control section 102, which controls the heater 100 of the heating drum 36, will be explained with reference to FIG. 2.

The control section 102 includes a temperature sensor 104, a heater driver 106 and a controller 108. The temperature sensor 104 detects the surface temperature of the heating drum 36. The controller 108 outputs a control signal to the heater driver 106 on the basis of a difference between the detected surface temperature and a set temperature t, or the like. The heater driver 106 supplies power from an a.c. power source 110 to the heater 100 by on/off control based on the control signal.

A set temperature t that can enable satisfactory image transfer at the heating drum 36 is stored in the controller 108. On the basis of the difference between the detected surface temperature of the heating drum 36 and the set temperature t, or the like, the controller 108 alters the duty ratio of the control signal by PID control.

The controller 108 alters the period of the control signal on the basis of variations in the surface temperature of the heating drum 36, or the like, differently for each of a printing mode, a standby mode, and a pre-heating mode, which modes are described later. Specifically, the period of the control signal is set to T1 (1 second) in the printing mode, T2 (2 seconds) in the standby mode, and T3 (4 seconds) in the pre-heating mode.

Now, operation of the image-forming device 10 having the structure described above is explained.

Figure 3A:
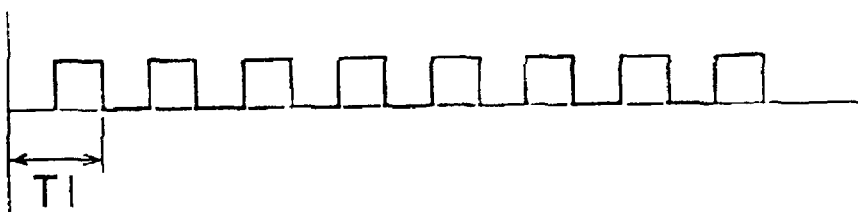
FIG. 3A is a timing chart of a control signal relating to the embodiment of the present invention.

In the image-forming device 10, when a power source is turned on, the controller 108 outputs a PID-controlled control signal for starting up the heater 100 to the heater driver 106. Based on this control signal, the heater driver 106 controls the surface temperature of the heating drum 36 to the set temperature t by on/off control of the heater 100. At this time, the period of the control signal is T1 (1 second), the same as for the below-described printing mode, as shown in FIG. 3A.

When the surface temperature of the heating drum 36 has been brought to the set temperature t by startup of the heater 100, the controller 108 decides to switch into the standby mode, which is continuously ready for image transfer. The period of the control signal is switched to T2 (2 seconds; see FIG. 3B). At this time, unlike during startup, the surface temperature of the heating drum 36 only needs to be maintained at the set temperature t. Therefore, the temperature can be fixedly maintained even though the period of the control signal (on/off control) is lengthened, that is, even though the time for which the heater 100 is off is lengthened. Accordingly, the frequency of the control signal (on/off control) is reduced to 0.5 Hz, which is further away from 10 Hz, the frequency of maximum sensitivity to flicker. Thus, flicker can be suppressed.

When the image-forming device 10 commences image formation, it switches into the printing mode. That is, the period of the control signal is switched to T1 (1 second; see FIG. 3A). When the image-forming device 10 switches into the printing mode, the photosensitive material 18 is exposed by the scanning head 26 at the exposure drum 24, coated with water from the bottle for water coating 32 by the coating member 34, and superposed with the transfer material 42 at the heating drum 36. When the water-coated photosensitive material 18 and the transfer material 42 are wound onto the heating drum 36, the surface temperature of the heating drum 36 consequently falls. Therefore, if the control interval is not shortened, the surface temperature of the heating drum 36 cannot be maintained at the set temperature t, in which case temperature variations may cause irregularities in the density of the image formed on the transfer material 42.

When a batch of image transfers has finished, the controller 108 switches back from the printing mode to the standby mode. That is, the period of the control signal is set to T2.

Further, if a predetermined period of time passes in which no images are formed (transferred), in order to suppress power consumption while keeping startup time of the heating drum 36 short, the image-forming device 10 switches into the pre-heating mode. The pre-heating mode maintains the surface temperature of the heating drum 36 at a set temperature which is lower than the set temperature t. In the pre-heating mode, the period of the control signal is set to T3 (4 seconds; see FIG. 3C), which is even longer than the period of the control signal in the standby mode T2 (2 seconds). Here, the period of on/off control can be extended, due to the set temperature being lower than in the standby mode. Consequently, the frequency of the control signal (on/off control) is reduced to 0.25 Hz, and flicker can be further suppressed compared to the printing mode and the standby mode.

Additionally, the bottle for water coating 32 is temperature-adjusted to a predetermined temperature in advance. By offsetting the timing of on/off control for this temperature adjustment from the timing of the on/off control of the heater 100 (i.e., not having both on at the same time), voltage variations that can be caused by the image-forming device 10 are reduced, and flicker can be suppressed.

In the present embodiment, the period T3 of the control signal (on/off control) in the pre-heating mode is set to longer than the period in the standby mode T2. However the relationship between the pre-heating mode period T3 and the standby mode period T2 is not limited to this relationship, as long as both these periods are longer than the printing mode period T1.

Further, one of the pre-heating mode period T3 and the standby mode period T2 may be the same as the printing mode period T1, as long as the other of T3 and T2 is longer than T1. For example, even if the standby mode period T2 is set to be the same as the printing mode period T1, flicker caused by the image-forming device 10 can be suppressed if the pre-heating mode period T3 is longer than the printing mode period T1.

Figure 3B:
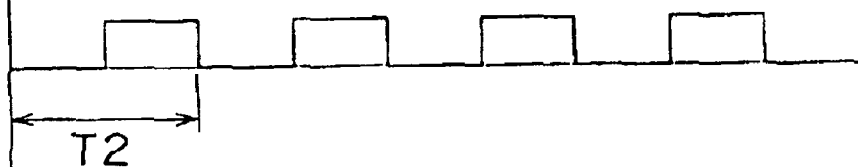
FIG. 3B is a timing chart of a control signal relating to the embodiment of the present invention.
Figure 3C:
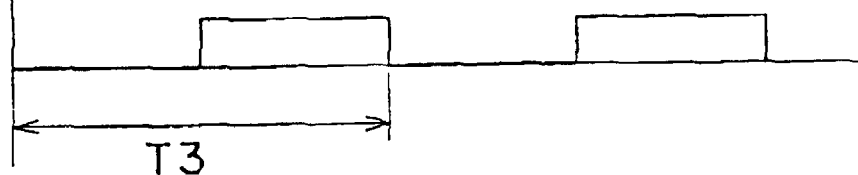
FIG. 3C is a timing chart of a control signal relating to the embodiment of the present invention.

Moreover, in FIGS. 3A, 3B and 3C, for ease of explanation, the duty ratio of the control signal is shown as being fixed. However, the duty ratio is, of course, varied by PID control.

Furthermore, the present embodiment is provided with the printing mode, the standby mode and the pre-heating mode. However, it is also possible to provide only the printing mode and an ordinary mode. In such a case, the above-described effects can be achieved by a period of on/off control of the ordinary mode T0 being longer than the printing mode period T1.

Above, the present invention has been explained for use in an image-forming device in which an image is transferred from a photosensitive material to a transfer material. However, the present invention can also be applied in different types of image-forming device, such as described below.

Figure 4:
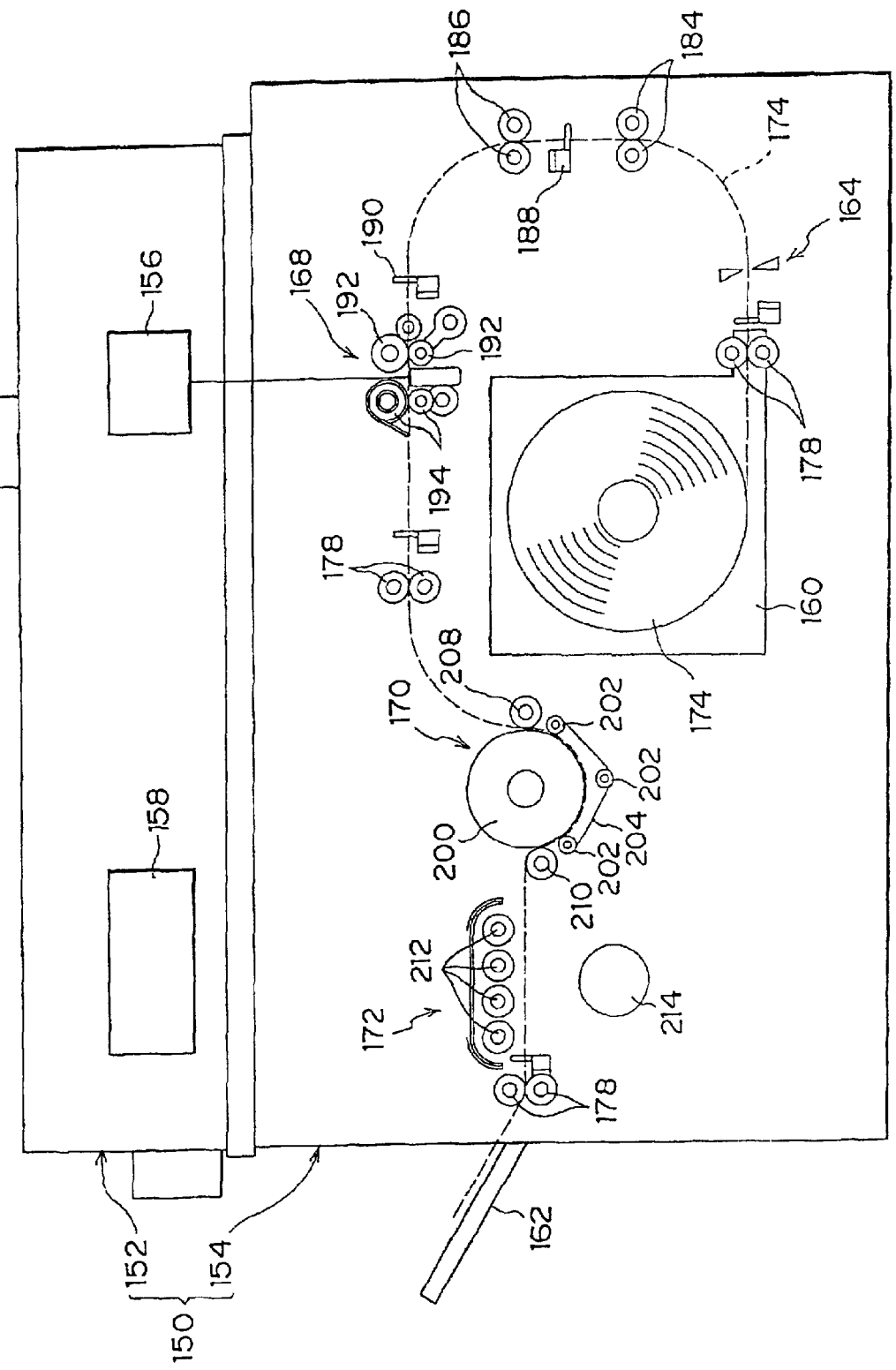
FIG. 4 is a schematic structural diagram of an image-forming device relating to another embodiment of the present invention.

For example, the present invention can be applied to an image forming device 150 shown in FIG. 4, which does not use a transfer material.

In the image-forming device 150, a photosensitive thermal recording material 174 is drawn out from a magazine 160 and exposed at an exposure section 168 to form a latent image. The latent image is developed at a developing section 170, and the resulting image is fixed at a fixing section 172.

The structure of this image-forming device 150 is briefly explained below with regard to processing of the photosensitive thermal recording material.

In an image-recording process section 154 of the image-forming device 150, the photosensitive thermal recording material 174 is drawn out from the detachable magazine 160 by drawing-out transport rollers 178, and transported by first transport rollers 184 and second transport rollers 186. This transportation is paused when a distal end of the photosensitive thermal recording material 174 is detected by one of a first timing sensor 188 and a second timing sensor 190, and the photosensitive thermal recording material 174 is cut to A5 or A4 size by a cutter 164. The photosensitive thermal recording material 174 that has been cut off is, while being transported through the exposure section 168 by transport rollers 192 and 194, exposed on the basis of image data from an image-processing section 156. Thus, the latent image is formed. The photosensitive thermal recording material 174 on which the latent image has been formed is brought to the developing section 170 by a second set of the transport rollers 178, and wound onto a heating drum 200 by a guide roller 208. The photosensitive thermal recording material 174 is pressed against the heating drum 200 by an endless belt 204, which is wound around three guide rollers 202, and the latent image is developed. Then, the photosensitive thermal recording material 174 is peeled from the heating drum 200 by a guide roller 210 and transported to the fixing section 172. A fixing treatment is performed at the fixing section 172 by fixing light sources 212 and a fixing heater 214. Thus, printing of the photosensitive thermal recording material 174 is completed and the photosensitive thermal recording material 174 is ejected to an output tray 162.

The image-forming device 150 is structured so as to be capable of maintaining the surface temperature of the heating drum 200 at a predetermined set temperature, as in the first-described embodiment. A control section 158, which is provided at an electronics section 152, performs on/off control of the heating drum 200. The period of on/off control at the control section 158 is switchable between a printing mode, a standby mode and a pre-heating mode.

Accordingly, by controlling the period of on/off control of the heating drum 200 based on the printing mode, standby mode and pre-heating mode, this image-forming device 150 can suppress flicker.

As explained above, in an image-forming device relating to the present invention, by altering the period of on/off control of a heating device at a heating drum in accordance with control modes, flicker can be suppressed.

What is claimed is:

1. An image-forming device which forms an image on a recording material at a heating drum heated to a predetermined temperature, the device comprising:

a heating device which heats the heating drum; and a control device which controls the heating device by on/off control based on an on/off control signal and alters a period of the on/off control signal in accordance with control modes, the period of the on/off control signal expressing an amount of time required for one on/off cycle, and multiple on/off cycles being repeated in any one control mode, the control modes comprising (a) a printing mode for maintaining the heating drum at the predetermined temperature during image-formation, and (b) at least one ordinary mode which is used at times other than during image-formation, wherein, the period of the on/off control signal of the printing mode (T1) is less than the period of the on/off control signal of the at least one ordinary mode (T0).

2. The image-recording device of claim 1, wherein the ordinary mode includes a standby mode which maintains temperature of the heating drum at the predetermined temperature such that image-formation can be initiated promptly, and a pre-heating mode which reduces power consumption of the heating drum while keeping the heating drum in a state such that image-formation can be initiated in a short time, and, if the period of on/off control of the printing mode is T1, a period of on/off control of the standby mode is T2 and a period of on/off control of the pre-heating mode is T3, then at least one of the following relationships: T1<T2 and T1<T3 is satisfied.

3. The image-forming device of claim 2, wherein the periods T1, T2 and T3 are set so as to satisfy the relationship T1<T2<T3.

4. The image-forming device of claim 2, wherein, when image-formation has finished, the printing mode is deselected and the standby mode is selected.

5. The image-forming device of claim 2, wherein, if the standby mode is selected and no image-formation is performed for a predetermined period of time, then the pre-heating mode is selected.

6. The image-forming device of claim 2, wherein, in the pre-heating mode, the heating drum is maintained at a temperature lower than the predetermined temperature.

7. The image-forming device of claim 1, wherein information of the image is recorded onto a photosensitive material by exposure, and the image is formed on a transfer material which is superposed with the photosensitive material at the heating drum.

8. The image-forming device of claim 1, wherein the control device alters a duty ratio of on/off control in response to a difference between a current temperature of the heating drum and the predetermined temperature.

9. The image-forming device of claim 1, wherein from a time when a power source of the image-forming device is turned on until a time when the predetermined temperature is reached, the period of on/off control of the heating drum is set to a period the same as the period of on/off control of the printing mode, and when the predetermined temperature has been reached, the ordinary mode is selected for maintaining the predetermined temperature.

10. The image-forming device of claim 1, wherein there is another temperature control signal at the image-forming device, and a temperature control signal of the heating drum has a phase difference with respect to the other temperature control signal.

11. The image-forming device of claim 1, wherein information of the image is recorded onto a light and heat sensitive material by exposure, and the image is formed on the light and heat sensitive material by heating at the heating drum.

12. An image-farming device in which image information is exposed onto and carried by photosensitive material, and an image is formed on transfer material by the transfer material being superposed with the photosensitive material at a beating drum heated to a predetermined temperature, the device comprising:

a heating device which heats the heating drum; and a control device which controls the heating device by on/off control based on an on/off control signal and alters a period of the on/off control signal in accordance with control modes, the period of the on/off control signal expressing an amount of time required for one on/off cycle, and multiple on/off cycles being repeated in any one control mode, the control modes comprising (a) a printing mode for maintaining the heating drum at the predetermined temperature during image-formation, (b) a standby mode for keeping the heating drum in a state such that image-formation can be initiated promptly, and (c) a pre-beating mode for reducing power consumption of the heating drum while keeping the heating drum in a state such that image-formation can be initiated in a short time, wherein, when the period of the on/off control signal of the printing mode is T1, the period of the on/off control signal of the standby mode is T2 and a the period of the on/off control signal of the pre-heating mode is T3, then T1$\leq$T2, T1$\leq$T3, and at least one of T2 and T3 is greater than T1.

13. The image-forming device of claim 12, wherein T1<T2<T3.

14. An image-forming device which forms an image on a recording material at a heating drum heated to a predetermined temperature, the device comprising:

a heating device which heats the heating drum; and a control device which controls the heating device by on/off control based on an on/off control signal and alters a period of the on/off control signal in accordance with control modes, the period of the on/off control signal expressing one on/off cycle time, and multiple on/off cycles being repeated in any one control mode, the control modes comprising (a) a printing mode for maintaining the heating drum at the predetermined temperature during image-formation, and (b) at least one ordinary mode which is used at times other than during image-formation, wherein, the period of the on/off control signal of the printing mode (T1) is less than the period of the on/off control signal of the at least one ordinary mode (T0).

* * * * *